US011171859B2

(12) United States Patent
Murao

(10) Patent No.: US 11,171,859 B2
(45) Date of Patent: Nov. 9, 2021

(54) LARGE-SCALE NODE CONFIGURATION MANAGEMENT FOR MAAS PLATFORM

(71) Applicant: SONY CORPORATION, Tokyo (JP)

(72) Inventor: Sadayoshi Murao, Bangalore (IN)

(73) Assignee: SONY CORPORATION, Tokyo (JP)

( * ) Notice: Subject to any disclaimer, the term of this patent is extended or adjusted under 35 U.S.C. 154(b) by 22 days.

(21) Appl. No.: 16/855,201

(22) Filed: Apr. 22, 2020

(65) Prior Publication Data

US 2020/0351192 A1 Nov. 5, 2020

Related U.S. Application Data

(60) Provisional application No. 62/841,583, filed on May 1, 2019.

(51) Int. Cl.

| *H04L 12/751* | (2013.01) |
|---|---|
| *H04L 12/741* | (2013.01) |
| *H04L 12/24* | (2006.01) |
| *H04L 29/08* | (2006.01) |
| *G06F 11/36* | (2006.01) |
| *H04L 12/715* | (2013.01) |

(Continued)

(52) U.S. Cl.
CPC .......... *H04L 45/02* (2013.01); *G06F 11/3688* (2013.01); *H04L 41/082* (2013.01); *H04L 45/54* (2013.01); *H04L 45/74* (2013.01); *H04L 67/26* (2013.01)

(58) Field of Classification Search
CPC ....... H04L 45/02; H04L 45/54; H04L 41/082; H04L 67/26; H04L 45/74; H04L 45/64; H04L 43/0811; G06F 11/3688
See application file for complete search history.

(56) References Cited

U.S. PATENT DOCUMENTS

| 2003/0095555 A1 | 5/2003 | McNamara et al. |
|---|---|---|
| 2007/0061487 A1 | 3/2007 | Moore et al. |
| 2018/0167476 A1 | 6/2018 | Hoffner et al. |

(Continued)

OTHER PUBLICATIONS

Ramachandran, et al., "Trinity: A Distributed Publish/Subscribe Broker with Blockchain-based Immutability", Distributed, Parallel, and Cluster Computing, Jun. 3, 2018, 08 pages.

(Continued)

*Primary Examiner* — Asghar H Bilgrami
(74) *Attorney, Agent, or Firm* — Chip Law Group

(57) ABSTRACT

A system for node configuration management for a MaaS platform is provided. The system includes a central node device and a group of node devices associated with a publish-subscribe pattern. The group of node devices includes a first node device that updates routing information associated with the first node device locally. The routing information includes routing rules for propagation of transaction requests to or from the first node device. The central node device receives the updated routing information from the first node device and records the updated routing information in a central routing configuration repository of the central node device. Based on the record, the central node device transmits the updated routing information to the set of second node devices, each of which receives the updated routing information, validates the updated routing information, and records the updated routing information locally based on the validation.

20 Claims, 7 Drawing Sheets

(51) Int. Cl.
*H04L 12/26* (2006.01)
*G06Q 50/30* (2012.01)

(56) References Cited

U.S. PATENT DOCUMENTS

2018/0287915 A1* 10/2018 Smith .................... H04L 51/22
2018/0350024 A1* 12/2018 Kaufman ........... G06Q 10/0833
2019/0102850 A1* 4/2019 Wheeler ............. G06Q 20/102

OTHER PUBLICATIONS

Andrew Psaltis, "Streaming Data: Understanding the real-time pipeline", Manning Publications, Jun. 22, 2017, 219 pages.
Ibsen, et al., "Camel in Action", Manning Publications, Dec. 31, 2010, 550 pages.
"Smoke testing (software)", Wikipedia, https://en.wikipedia.org/w/index.php?title=Smoke%20testing%20(software) &01did=883479774, Retrieved on Jul. 28, 2020, 2 pages.
"Oyster card", Wikipedia, https://en.wikipedia.org/w/index.php?title=Oyster%20card&01did=894703206, Retrieved on Jul. 28, 2020, 41 pages.
International Search Report and Written Opinion of PCT Application No. PCT/IB2020/054048, dated Jun. 19, 2020, 10 pages of ISRWO.

* cited by examiner

LARGE-SCALE NODE CONFIGURATION MANAGEMENT FOR MAAS PLATFORM

CROSS-REFERENCE TO RELATED APPLICATIONS/INCORPORATION BY REFERENCE

This application claims priority to U.S. Provisional Patent Application Ser. No. 62/841,583 filed on May 1, 2019, the entire content of which is hereby incorporated herein by reference.

FIELD

Various embodiments of the disclosure relate to Mobility-as-a-Service (MaaS) and distributed ledger technology. More specifically, various embodiments of the disclosure relate to a system and a method for large-scale node configuration management for a MaaS platform.

BACKGROUND

Many transportation providers provide their services through infrastructures based on a closed platform. For example, a transportation provider may have a separate ticketing infrastructure (such as ticketing gates and Point-of-Sale (PoS) devices) or a separate application (such as a ticket booking application or a ride hailing application) to create, pay for, or manage a trip. With growing number of transportation providers, there has been a demand for a Mobility-as-a-Service (MaaS) platform which may provide a unified gateway to create, pay for, and manage a trip that may rely on services of multiple transportation providers. A typical MaaS platform may include participation of multiple transportation providers, such as airline companies, ride hailing companies, car rental companies, carpooling companies, rail network companies, or a combination thereof. Typically, each transportation provider on the MaaS platform has a closed infrastructure with minimum to no connectivity with infrastructures of other transportation providers. With limited connectivity, updates associated with configurations of an individual node on the MaaS platform may propagate to other nodes on the MaaS platform at a much slower pace as compared to a required pace for efficient operation of the MaaS platform, especially for high volume MaaS transactions.

Limitations and disadvantages of conventional and traditional approaches will become apparent to one of skill in the art, through comparison of described systems with some aspects of the present disclosure, as set forth in the remainder of the present application and with reference to the drawings.

SUMMARY

A system and a method for large-scale node configuration management for a Mobility-as-a-Service (MaaS) platform, are provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
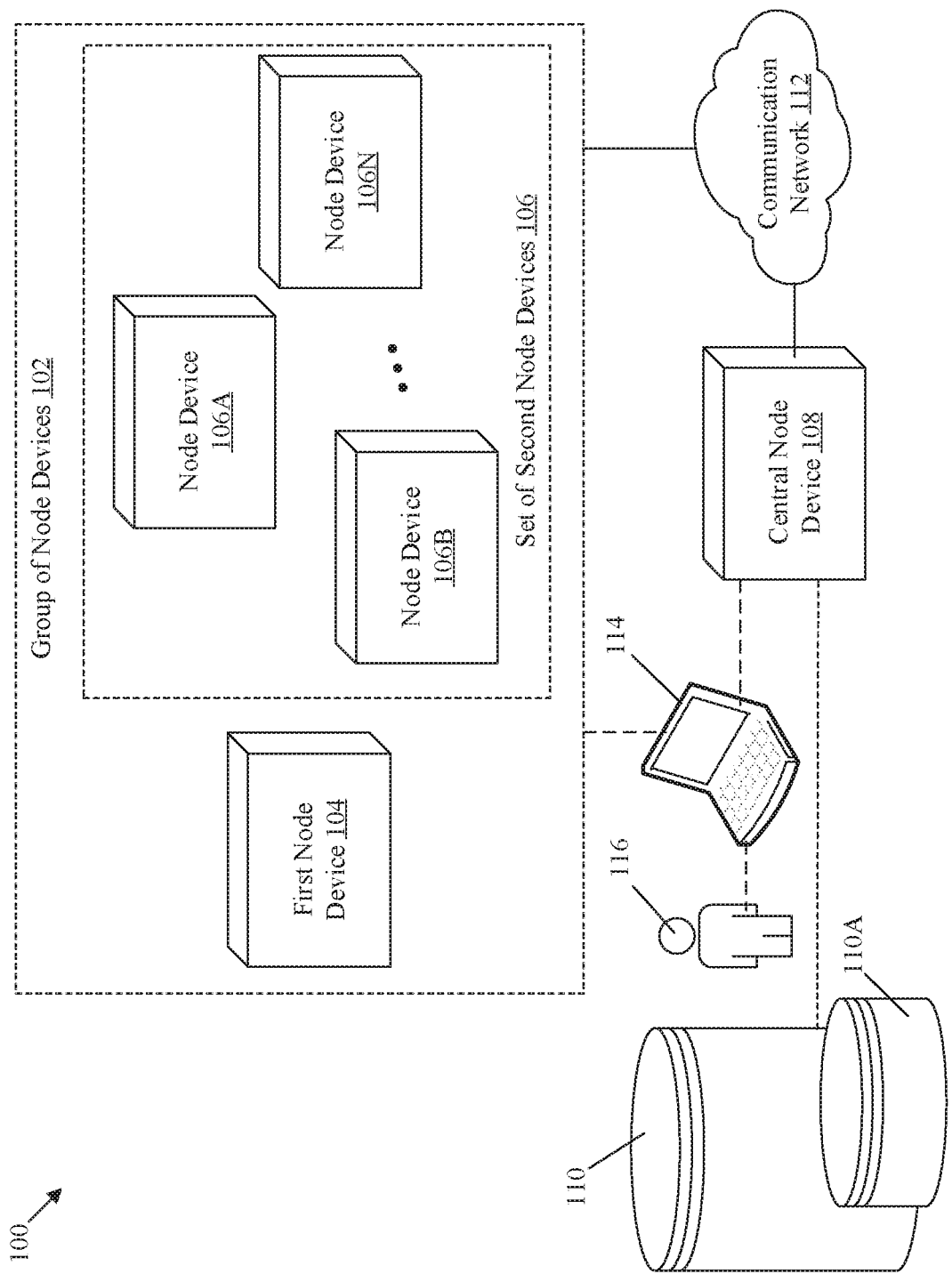
FIG. 1 is a diagram of an exemplary system for node configuration management for a Mobility-as-a-Service (MaaS) platform, in accordance with an embodiment of the disclosure.

The following described implementations may be found in the disclosed system and method for management of large-scale node configuration for a Mobility-as-a-Service (MaaS) platform. The disclosed system may be a federated transportation management system that may facilitate multiple homogeneous or heterogenous transport providers and their infrastructure, such as ticketing gates, applications, and/or Point of Sale (PoS) devices to operate on the MaaS platform to provide various transport services. Each transportation provider may enjoy secure data ownership and may control co-use of relevant transaction data through the distributed ledger. This may enhance connectivity between the various transportation providers.

With sharing of IT infrastructure amongst the transportation providers, each individual transport provider may save costs associated with ownership of Information Technology (IT) infrastructure and capex on operations and infrastructure expansion. Also, the distributed ledger may facilitate sharing of revenue amongst the transportation providers for a MaaS transport service based on transaction data records on the distributed ledger associated with the concerned transportation providers, who may be a party to transactions associated with a MaaS transport service.

Exemplary aspects of the disclosure provide a system that may include a group of node devices and a central node device which includes a central routing configuration repository. The group of node devices may be associated with a publish-subscribe pattern and may include a first node device and set of second node devices. The first node device may be configured to update routing information associated with the first node device locally. The routing information may include routing rules for propagation of transaction requests, associated with a transportation service, to or from the first node device. The central node device may be configured to receive the updated routing information from the first node device and record the updated routing information in the central routing configuration repository. Based on the record, the central node device may be configured to transmit the updated routing information to the set of second node devices. The set of second node devices, upon receipt of the updated routing information, may be configured to validate the received updated routing information and record the updated routing information locally based on the validation.

The central node device may facilitate a centralized storage of the updated routing information associated with any node device of the group of node devices. Additionally, the central node device may facilitate all active node device of the group of node devices in the validation of the updated routing information and in restoration of a previously stable version of the routing information in case the validation is unsuccessful. With centralized storage, the management of the routing information may become more efficient as each node device may obtain an updated version of routing information/configuration directly from the central node device. Specifically, the central node device may facilitate synchronization of the updated routing information/configuration among publisher node devices, broker node devices, and subscriber node devices of the group of node devices. Additionally, with centralized storage, updates associated with the routing information may be released to all active node devices, when new nodes (publishers/subscribers) are commissioned into the group of node devices or decommissioned from the group of node devices.

FIG. 1 is a diagram of an exemplary system for node configuration management for a Mobility-as-a-Service (MaaS) platform, in accordance with an embodiment of the disclosure. With reference to FIG. 1, there is shown a block diagram of a system 100. The system 100 includes a group of node devices 102 associated with a publish-subscribe pattern and a central node device 108 communicatively coupled to each node device of the group of node devices 102. The group of node devices 102 may include a first node device 104 and a set of second node devices 106. The set of second node devices 106 may include a node device 106A, a node device 106B, and a node device 106N. The central node device 108 may include a central storage repository 110. Each node device of the group of node devices 102 may be configured to communicate with the central node device 108 via one or more communication networks, such as a communication network 112. The system 100 may further include an Information Technology (IT) system 114 which may be managed by an IT administrator 116 of a MaaS platform. The IT system 114 may be communicatively coupled to the central node device 108 and/or with each node device of the group of node devices 102. It should be noted that the number of node devices in FIG. 1 are merely presented as example. The present disclosure may also be applicable to more or lesser number of node devices, without a deviation from the scope of the disclosure.

Each of the group of node devices 102 may include suitable logic, circuitry, code, and/or interfaces that may be configured to transmit, receive, or route transaction requests associated with a MaaS service which includes two or more homogenous or heterogenous (or multimodal) transportation services. In an embodiment, the node device 106A and the node device 106B may correspond to a publisher node and a broker node, respectively, if the first node device 104 corresponds to a subscriber node. In another embodiment, the node device 106A and the node device 106B may correspond to a subscriber node and a broker node, respectively, if the first node device 104 corresponds to a publisher node. In another embodiment, the node device 106A and the node device 106B may correspond to a publisher node and a subscriber node, respectively, if the first node device 104 corresponds to a broker node.

The first node device 104 may include suitable logic, circuitry, code, and/or interfaces that may be configured to store routing information associated with the first node device 104 locally on the first node device 104 or on a storage device communicatively coupled to the first node device 104. The routing information may include routing rules for propagation of transaction requests to or from the first node device 104. Examples of implementation of the first node device 104 may include, but are not limited to, a web server, an edge device, an edge node, a cloud server, a cluster of cloud-based servers, a workstation, or any computing device or system with a fog computing capability. In an exemplary embodiment, the first node device 104 may correspond to one of a publisher, a subscriber, or a message broker associated with a publish-subscribe pattern.

Each node device (such as the node device 106A or the node device 106B) of the set of second node devices 106 may include suitable logic, circuitry, code, and/or interfaces that may be configured to locally maintain an updated version of the routing information associated with the first node device 104. For example, the node device 106A may receive updated routing information associated with the first node device 104 from the central node device 108 and may validate the updated routing information with the central node device 108 to record the updated routing information locally on the node device 106A. Examples of implementation of each of the node device 106A and the node device 106B may include, but are not limited to, a web server, an edge device, an edge node, a cloud server, a cluster of cloud-based servers, a workstation, or any computing device or system with a fog computing capability.

The central node device 108 may include suitable logic, circuitry, code, and/or interfaces that may be configured to store relationships among individual nodes (e.g., publisher nodes, message broker, and subscriber nodes) in the form of routing information. For example, the central node device 108 may store the routing information associated with the first node device 104 as a routing configuration in the central storage repository 110. Additionally, the central node device 108 may also store routing information associated with each of the node device 106A and the node device 106B in the central storage repository 110. Examples of implementation of the central node device 108 may include, but are not limited to, a web server, an edge device, an edge node, a cloud server, a cluster of cloud-based servers, a workstation, or any computing device or system with a fog computing capability.

In accordance with an embodiment, the central storage repository 110 may include a central routing configuration repository 110A for storage of the routing information. Additionally, the central storage repository 110 may also store node information associated with each node device of the group of node devices 102. Examples of the central storage repository 110 may include, but are not limited to, a web server, a cloud server, or a local storage device.

The communication network 112 may include a communication medium through which each node device of the group of node devices 102 may communicate with the central node device 108. Examples of the communication network 112 may include, but are not limited to, the Internet, a cloud network, a Wireless Fidelity (Wi-Fi) network, a Personal Area Network (PAN), a Local Area Network (LAN), or a Metropolitan Area Network (MAN). Various node devices of the system 100 may be configured to connect to the communication network 112, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The IT system 114 may include suitable logic, circuitry, code, and/or interfaces that may be configured to transmit a release schedule to the central node device 108 for an update of the routing information stored locally on the first node device 104. Examples of the IT system 114 may include, but are not limited to, a mainframe computer, a workstation, a laptop, a personal computer, a mobile phone, or any computing device.

In operation, the IT system 114 may receive a user input from the IT administrator 116. The user input may be associated with the release schedule for the update of the routing information associated with the first node device 104. For example, the IT system 114 may include a spreadsheet application, through which the IT administrator 116 may provide the user input to set the release schedule for the update of the routing information. The IT system 114 may store the set release schedule in the central routing configuration repository 110A of the central storage repository 110 in the central node device 108. The central node device 108 may transmit the set release schedule to the first node device 104 for the update of the routing information to the first node device 104.

The first node device 104 may receive the set release schedule and store the set release schedule locally. Thereafter, based on the release schedule, the first node device 104 may update the routing information associated with the first node device 104 locally. In another embodiment, the first node device 104 may update the routing information associated with the first node device 104 locally without the release schedule. Thereafter, the first node device 104 may transmit the updated routing information to the central node device 108. The central node device 108 may receive the updated routing information and may record the updated routing information in the central storage repository 110 as a new routing configuration associated with the first node device 104. Thereafter, based on the record, the central node device 108 may transmit the updated routing information to the set of second node devices 106.

Each of the set of second node devices 106 may receive the updated routing information associated with the first node device 104 and may validate the updated routing information. In an embodiment, such validation may correspond to a check for whether a release version of the updated routing information is latest (i.e. a most recent release from the first node device 104). In another embodiment, such validation may correspond to another check for fitness of the updated routing information with a stored version of the routing information on a broker node device of the group of node devices 102. Herein, the broker node device may be one of the first node device 104, the node device 106A, or the node device 106B. The check for fitness may involve execution of a software-based smoke test of the updated routing information. Each node device (such as the node device 106A or the node device 106B) of the set of second node devices 106 may locally record the updated routing information based on the validation. An exemplary implementation of the system 100 for a distributed ledger based MaaS platform is provided, for example, in FIG. 2.

The central node device 108 facilitates a centralized storage of the updated routing information associated with any node device of the group of node devices 102. With centralized storage, the management of the routing information may become more efficient as each node device may be able to obtain an updated version of routing information/configuration from the central node device 108. This may also help to release updates associated with the routing information to all active node devices when new nodes (publishers/subscribers) are commissioned into the group of node devices 102 of the system 100 or decommissioned from the group of node devices 102 of the system 100.

Figure 2:
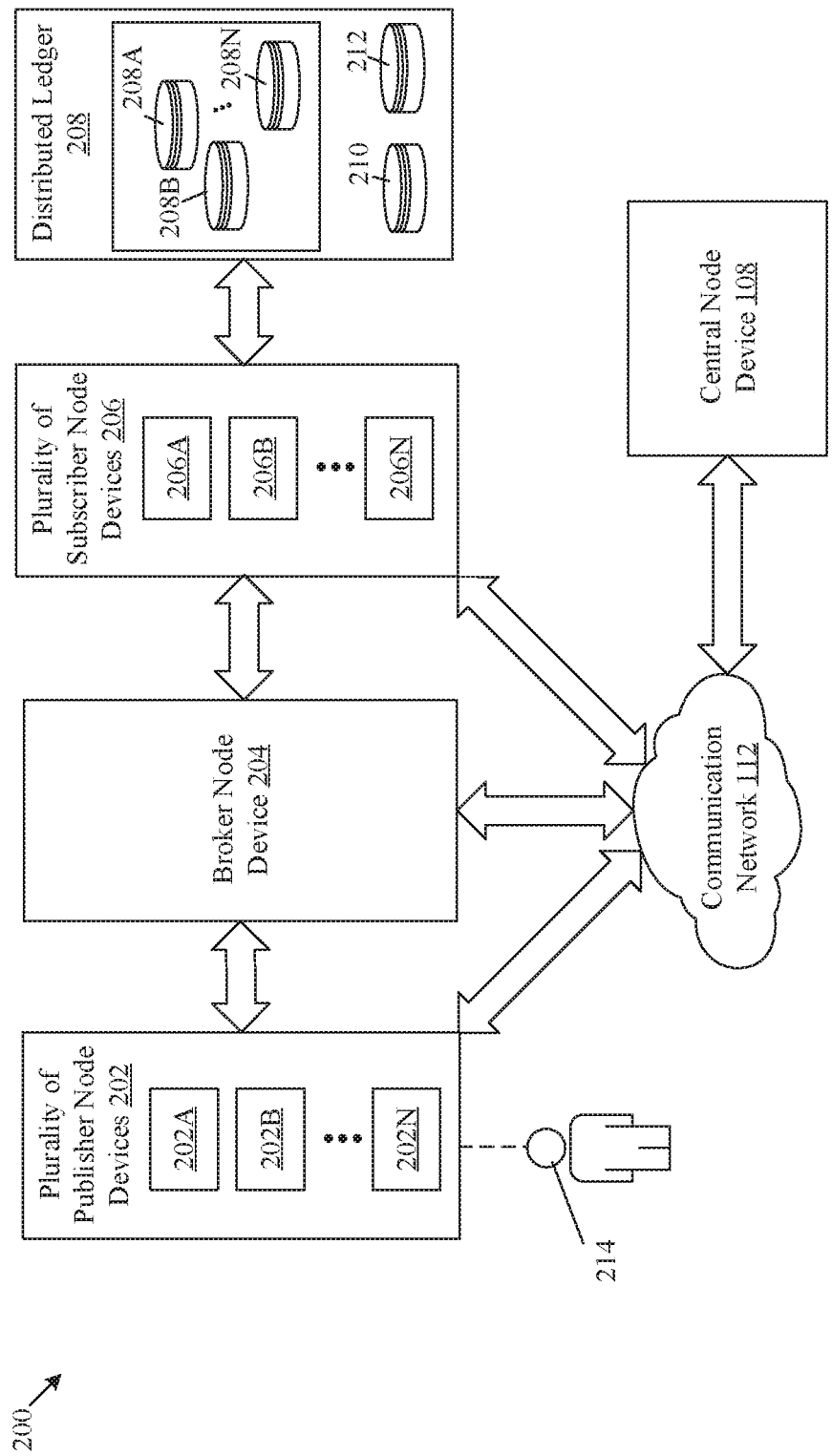
FIG. 2 is a diagram that illustrates an exemplary implementation of the system of FIG. 1 for a distributed ledger based MaaS platform, in accordance with an embodiment of the disclosure.

FIG. 2 is a diagram that illustrates an exemplary implementation of the system of FIG. 1 for a distributed ledger based MaaS platform, in accordance with an embodiment of the disclosure. FIG. 2 is explained in conjunction with elements from FIG. 1. With reference to FIG. 2, there is shown a block diagram of a system 200 for a distributed ledger based MaaS platform. The distributed ledger based MaaS platform may provide a federated transportation management that may facilitate multiple homogeneous or heterogeneous transport providers and their infrastructure, such as ticketing gates, applications, and/or PoS devices to operate on a common MaaS platform to provide various transport services. Such services may be provided by a group of homogeneous transport providers (e.g., multiple cab ride provider companies) or a group of heterogenous transport providers (e.g., ride-hailing companies, rail companies, flight companies, and bus travel companies) through one or more of Point of Sale (POS) devices, mobile or web applications for travel bookings, or ticketing gates or terminals. Each transportation provider may enjoy secure data ownership and may control co-use of relevant transaction data through a distributed ledger. This may enhance connectivity between the various transportation providers.

The system 200 may include a first publisher node device 202A, a second publisher node device 202B, and an nth publisher node device 202N (hereinafter, collectively referred to as a plurality of publisher node devices 202) associated with a plurality of transportation providers of a MaaS transport service. The system 200 may further include a broker node device 204 and a first subscriber node device 206A, a second subscriber node device 206B, and an nth subscriber node device 206N. The first subscriber node device 206A, the second subscriber node device 206B, and the nth subscriber node device 206N may be collectively referred to as a plurality of subscriber node devices 206 associated with the plurality of transportation providers. The system 200 may further include a distributed ledger 208 that may include a plurality of nodes, such as a first node 208A, a second node 208B, and an nth node 208N. The distributed ledger 208 may further include a counter-party node 210 and a consensus node 212. The system 200 may further include the central node device 108 that may include the central storage repository 110.

The number of the publisher node devices, the subscriber node devices, and the nodes of the distributed ledger 208 in FIG. 2 are merely presented as example. The present disclosure may also be applicable to more or lesser number of the publisher node devices, the subscriber node devices, and the nodes of the distributed ledger 208, without a deviation from the scope of the disclosure.

As the system 200 is an exemplary implementation of the system 100 of FIG. 1, the group of node devices 102 may include the plurality of publisher node device 202, the broker node device 204, and the plurality of subscriber node devices 206. In an embodiment, the group of node devices 102 may further include a plurality of nodes of the distributed ledger 208. Among the plurality of publisher node device 202, the broker node device 204, the plurality of subscriber node devices 206, and the plurality of nodes of the distributed ledger 208, any node device whose routing information is updated may be referred to as the first node device 104. All the other node devices may be referred to as the set of second node devices 106.

In an embodiment, the set of second node devices 106 may include the plurality of publisher node devices 202, the broker node device 204, and/or node(s) of the distributed ledger 208 if the first node device 104 is one of the plurality of subscriber node devices 206. In another embodiment, the set of second node devices 106 may include the plurality of publisher node devices 202, the plurality of subscriber node devices 206, and/or node(s) of the distributed ledger 208 if the first node device 104 is the broker node device 204. In another embodiment, the set of second node devices 106 may include the broker node device 204, the plurality of subscriber node devices 206, and/or node(s) of the distributed ledger 208 if the first node device 104 is one of the plurality of publisher node devices 202. In another embodiment, the set of second node devices 106 may include the broker node device 204, the plurality of subscriber node devices 206, and the plurality of publisher node devices 202 if the first node device 104 is one of node(s) of the distributed ledger 208.

The broker node device 204 may be configured to communicate with each of the plurality of publisher node devices 202 and each of the plurality of subscriber node devices 206 through a suitable network protocol for a publish-subscribe pattern. Examples of such protocol may include, but are not limited to, a Message Queuing Telemetry Transport (MQTT)-based messaging protocol, an Advanced Message Queuing Protocol (AMQP)-based messaging protocol, or a Message-Oriented Middleware (MOM)-based messaging framework.

Each of the plurality of subscriber node devices 206 may be associated with a corresponding node of the distributed ledger 208. For example, the first subscriber node device 206A may be associated with the first node 208A, the second subscriber node device 206B may be associated with the second node 208B, and the nth subscriber node device 206N may be associated with the nth node 208N of the distributed ledger 208.

The distributed ledger 208 may include the counter-party node 210 (also referred to as a MaaS provider node device) and the consensus node 212. In an embodiment, at least two nodes of the distributed ledger 208 may store transaction data associated with a transport service. The transportation data may be associated with one or more transportation providers and/or a user 214 who may avail the transport service through a unified MaaS interface or the plurality of publisher node devices 202.

For example, the transaction data may include a set of state objects, such as a first state object (also referred to as an initial state object) and a second state object (i.e. which corresponds to an updated version of the initial state object). Each state object may store a version of the transaction data, which may include a smart contract, a contract code (or rules of a transaction upon which parties to the transaction agree), and state properties (that may be updated when the transaction data is updated based on transaction requests from publisher node devices).

Each publisher node device of the plurality of publisher node device 202 may include suitable logic, circuitry, code, and/or interfaces that may be configured to publish transaction requests to one or more subscriber node devices of the plurality of subscriber node devices 206 through the broker node device 204. Each publisher node device may publish a transaction request based on occurrence of an event associated with a MaaS transaction (such as a creation, a start, or an end of a transport service associated with a trip consisting of services of one or more transport providers). Examples of the plurality of publisher node devices 202 may include, but are not limited to, a device including a ride booking app, a ticketing gate, or a Point-of-Sale (PoS) device, associated with a publisher node device.

In an embodiment, each of the plurality of publisher node devices 202 may be installed at a transport service terminal associated with a transportation provider. The transport service interface of the transport service terminal may correspond to a user interface that may trigger an event associated with the MaaS transaction based on a user input from the user 214. For example, the first publisher node device 202A of the first transportation provider may receive an input from the user 214 via a user interface of the first publisher node device 202A. The input may include a request to create a transport service (i.e. a MaaS service) based on a travel plan associated with the user 214.

By way of example, and not limitation, the first publisher node device 202A may provide a user interface, through which the first publisher node device 202A may receive a user input from the user 214. The received user input may indicate a request for a creation of a MaaS-based transport service for the user 214 based on a travel plan associated with the user 214. In response to such received user input, the first publisher node device 202A may generate a transaction request that may include a create message associated with a creation of the MaaS-based transport service for the user 214. For example, the create message may include details of transportation providers, travel plan/route associated with a transport service, a source location, a destination location, or intermediate locations between the source location and the destination location. The create message may also include payment details associated with the entire bundle of transport services booked by the user 214. The transport service may be a combination of individual service offerings of one or more homogenous or heterogeneous transportation providers. For example, a ticketing gate, a ride hailing app, or a PoS terminal of a MaaS provider may receive a request for creation of a multimodal transport service (e.g., a combination of bus, cab, and flight) from the user 214 via the input. Herein, the multimodal transport service may include, for example, a train service, a bus service, a taxi/cab service, a metro rail service, an air-plane service, a fleet service, a ride hailing service, a car sharing service, a carpool service, a car rental service, a bike sharing service, or a combination thereof.

Alternatively, when the user 214 initiates a MaaS-based transport service, the first publisher node device 202A may generate a transaction request that may include a get-in message that may correspond to a start of the MaaS-based transport service for the user 214. As an example, such initiation of the MaaS-based transport service may be associated with an event, such as when the user 214 enters through a railway ticketing gate (the first publisher node device 202A) to board a train (associated with a transportation provider) or when a cab ride is started. Alternatively, when the user 214 completes a usage of a MaaS-based transport service, the first publisher node device 202A may generate a transaction request that may include a get-out message that may correspond to a completion of the MaaS-based transport service for the user 214. As an example, such completion of the MaaS-based transport service may be associated with an event, such as when the user 214 exits through an electronic railway exit gate (the first publisher node device 202A) after disembarking from a train (associated with a transportation provider) or when a cab ride ends.

The broker node device 204 may include suitable logic, circuitry, code, and/or interfaces that may be configured to route transaction requests from the plurality of publisher node devices 202 to the plurality of subscriber node devices 206. Examples of the broker node device 204 may include, but are not limited to, an application server, a cloud server, a mainframe server, a database server, a file server, a web server, or other type of servers.

In an embodiment, the broker node device 204 may create topics associated with a plurality of transport services. Some of the topics may be associated with a service plan offered by a transport service, which may be a part of a MaaS transport service.

For example, a topic may correspond to a car-pooling service plan offered by a ride-hailing transportation provider. Another topic may correspond to a ride-sharing service plan offered by a ride-hailing transportation provider. Some other topics may be associated with a type of transport vehicle (e.g., high-speed rail, moderate speed rail, or low speed rail, a luxury sedan, a passenger vehicle, a limousine, a taxi, a bike, or a bus), a holiday package, a travel purpose (e.g., business or pleasure), a travel class (e.g., business, economy), or a region-specific plan for domestic or international flights.

The plurality of publisher node devices 202 may subscribe to one or more topics of the broker node device 204 to publish transaction requests including transaction messages associated with the subscribed one or more topics. Similarly, the plurality of subscriber node device 206 may subscribe to one or more topics of the broker node device 204 to receive transaction requests including transaction messages associated with the subscribed one or more topics.

Each of the plurality of subscriber node devices 206 may include suitable logic, circuitry, code, and/or interfaces that may be configured to receive transaction requests from one or more publisher node devices of the plurality of publisher node devices 202. For example, the first subscriber node device 206A of the first transportation provider may register with the broker node device 204 and subscribe to a topic (e.g., a cab service) which is associated with transaction requests published by the first publisher node device 202A of the same transportation provider (i.e., the first transportation provider). Herein, the subscription to the topic may establish a relationship for routing transaction requests from the first publisher node device 202A to the first subscriber node device 206A.

In some embodiments, the routing information associated with the first publisher node device 202A or the first subscriber node device 206A may include information associated with topic subscriptions. Such information may be used as routing rules for propagation of transaction requests from the first publisher node device 202A to the first subscriber node device 206A, through the broker node device 204. Examples of implementation of a subscriber node device may include, but are not limited to, a web server, an edge device, an edge node, a cloud server, a cluster of cloud-based servers, a workstation, or any computing device or system with a fog-computing capability.

The distributed ledger 208 may be a decentralized and distributed database system that may maintain an immutable record of data operations or transactions. A set of data operations may be grouped together as a block and may be further linked to a previous block of data operations to form a chain of a plurality of blocks. All blocks of data operations may be stored in a decentralized manner, whereby at least two participants or nodes of the distributed ledger 208 may store a sub-set of the plurality of blocks associated with one or more transactions in which at least two participants or nodes may participate. Further, the distributed ledger 208 may include an operating system (for example, a Java Virtual Machine (JVM)) which may allow for deployment of a smart contract between multiple parties, for example, mobility provider node(s) (also referred to as a transportation provider node, such as the first node 208A of the first transportation provider) and the counter-party node 210 (i.e. the MaaS provider node).

By way of example, and not limitation, the distributed ledger 208 may be a Corda blockchain, an Ethereum blockchain, or a Hyperledger blockchain. The distributed ledger 208 (for example, the Corda blockchain) may store a set of immutable state objects that can be tracked by the distributed ledger 208. The state object may include transaction data, such as a smart contract between parties, contract code (rules of transaction), and content including state properties with certain state values. The smart contract may include a set of conditions under which multiple parties to the smart contract may agree to interact with each other. The smart contract may run on one or more nodes of the distributed ledger 208 and may govern transitions between state objects to generate a transaction. The smart contract may be written once, reused for a large numbers of state objects, and may refer to a governing legal prose by way of cryptographic hashes.

The distributed ledger 208 may use secure cryptographic hashes to identify parties and data and also to link a state object to a previous version of the state object to provide chains of provenance. A transaction between a group of parties may be stored on the distributed ledger 208 such that only the group of parties associated with the transaction may be able to view the transaction. A party associated with a transaction may store a current state object of the transaction in a vault (a database associated with the distributed ledger 208). Another party eligible to view or process the transaction (e.g., validate the transaction) may retrieve the current state object of the transaction from the vault. Additionally, each state object of the distributed ledger 208 may include a smart contract between the parties or nodes that may participate in an associated transaction.

On the distributed ledger 208, a participant or a node (for example, the first node 208A) may update a transaction by updating state properties of an input state object to produce an output state object. The updated transaction may thereby create a chain of provenance (which may be associated with the transaction data). The distributed ledger 208 may provide a consensus for the updated transaction based on a determination of a validity of the updated transaction and a determination of a uniqueness of the updated transaction. In an embodiment, the participants of nodes associated with the updated transaction may determine the validity of the updated transaction by an independent execution of smart contracts and validation logic associated with the transaction. The consensus node 212 may determine the uniqueness of the updated transaction based on a check that there exists no other transaction that has reached a consensus by use of the same input state object as the current transaction.

In accordance with an embodiment, the distributed ledger 208 may be associated with a decentralized application that may include a client-side interface (a front-end) and a server-side interface (a back end). The decentralized application may be configured to implement a workflow (e.g., a Corda flow) associated with the blockchain to record a transaction on a node of the distributed ledger 208 (such as the first node 208A of the distributed ledger 208). The client-side interface may be hosted on each of the plurality of subscriber node devices 206. For example, the client-side interface of the decentralized application may be a Remote Procedure Call (RPC) client that may be configured on each subscriber node device and the counter-party node 210 (i.e. the MaaS provider node). The server-side interface of the decentralized application may run on each node of the distributed ledger 208.

In an embodiment, the transaction request from a publisher node device may initiate a MaaS transaction between a mobility provider node (such as the first node 208A of the distributed ledger 208) and a MaaS provider node (i.e. the counter-party node 210). The distributed ledger 208 may store records for the MaaS transaction between two parties, i.e., the mobility provider node (e.g., the first node 208A of the first mobility provider) and the MaaS provider node (i.e. the counter-party node 210).

In case of multiple MaaS providers, the system 200 may include a plurality of MaaS provider nodes, each of which may be associated with a certain MaaS provider and included in a separate distributed ledger for the respective MaaS provider. In certain scenarios, the plurality of MaaS provider nodes may be included in a common distributed ledger, such as the distributed ledger 208.

In an embodiment, the first node 208A may be one of many database nodes of the distributed ledger 208 and may be configured to receive the transaction request including the transaction message from the first subscriber node device 206A, which may receive the transaction request from the first publisher node device 202A, via the broker node device 204. The first node 208A may be configured to update an initial state object associated with the distributed ledger 208 based on a transaction message in the received transaction request to output an updated state object. The first node 208A may be further configured to build a transaction that may include the initial state object and the updated state object.

The counter-party node 210 may be associated with a MaaS provider and may be also referred to a MaaS provider node. In an embodiment, the counter-party node 210 may include suitable logic, circuitry, code, and/or interfaces that may be configured to process a transaction request received by a subscriber node device of the plurality of subscriber node devices 206. The consensus node 212 may include suitable logic, circuitry, code, and/or interfaces that may be configured to notarize a transaction associated with the distributed ledger 208. Further details of operation of node devices of the system 200 are explained, for example, in FIG. 3. An exemplary implementation for node configuration management for the distributed ledger based MaaS platform is provided, for example, in FIG. 4.

Figure 3:
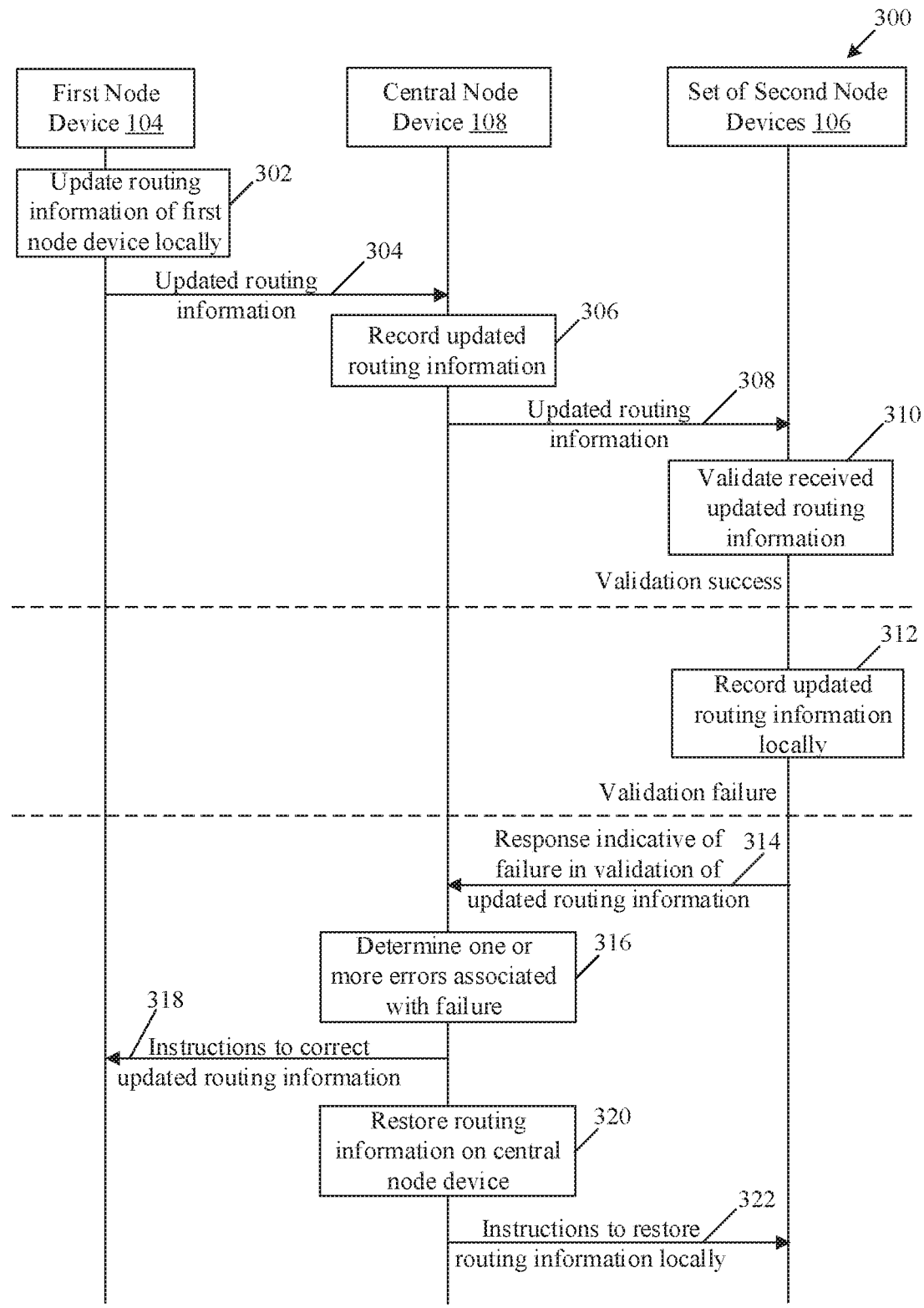
FIG. 3 is a sequence diagram that illustrates exemplary operations for management of node configuration for a MaaS platform, in accordance with an embodiment of the disclosure.

FIG. 3 is a sequence diagram that illustrates exemplary operations for management of node configuration for a MaaS platform, in accordance with an embodiment of the disclosure. FIG. 3 is explained in conjunction with elements from FIG. 1 and FIG. 2. With reference to FIG. 3, there is shown a sequence diagram 300 that illustrates a sequence of operations from 302 to 322. The sequence of operations may be executed by various node devices of the system 100 of FIG. 1 or the system 200 of FIG. 2.

At 302, routing information associated with the first node device 104 may be updated locally. For that, the IT system 114 may receive a user input from the IT administrator 116. The user input may be associated with a release schedule for the update of the routing information associated with the first node device 104. For example, the IT system 114 may include a spreadsheet application, through which the IT administrator 116 may provide the user input to set the release schedule for the update of the routing information. The IT system 114 may store the set release schedule in the central routing configuration repository 110A of the central storage repository 110.

The central node device 108 may transmit the set release schedule to the first node device 104 for the update of the routing information. The first node device 104 may receive the set release schedule and store the set release schedule locally. Thereafter, based on the release schedule, the first node device 104 may update the routing information associated with the first node device 104 locally. In another embodiment, the first node device 104 may update the routing information associated with the first node device 104 locally without the release schedule. The updated routing information may be stored in a memory of the first node device 104 or a storage device communicatively coupled to the first node device 104. The routing information may be updated so that the updated routing information can be released regularly to the central node device 108 and other node devices in the group of node devices 102. For example, if the release schedule of a certain version of the routing information is on Feb. 1, 2020 at 00:00 hours (UTC+5.5 hours), the first node device 104 may perform a planned switch to the new version (i.e. the updated routed information) of the routing information as per the date and time mentioned in the release schedule.

In an embodiment, the routing information may correspond to a relationship between a publisher node device and one or more topics on the broker node device 204 or between a subscriber node device and the one or more topics on the broker node device 204. Alternatively, the routing information may correspond to a relationship between a publisher node device, the one or more topics on the broker node device 204, and a subscriber node device.

In an embodiment, the update of the routing information may correspond to one or more of an addition of a first topic as a new transport service on the broker node device 204 of the group of node devices 102 or a deletion of a second topic as an existing transport service from the broker node device 204. For example, the first transportation provider may start a new cab service by addition of a new topic on the broker node device 204 or may stop an ongoing ride hailing service by deletion of an existing topic on the broker node device 204.

In another embodiment, the update of the routing information may correspond to one of addition of a first subscription to an existing topic on the broker node device 204 or a removal of the first subscription to an existing topic on the broker node device 204. For example, if the publisher node device (e.g., a POS machine)) unsubscribes or subscribes to an existing topic associated with an existing cab riding service, the publisher node device may update its routing information.

In another embodiment, the update of the routing information may correspond to reactivation of a previously deactivated subscription on an existing topic on the broker node device 204 or a deactivation of a currently active subscription to an existing topic on the broker node device 204. As an example, due to business reasons or government policies, a transportation provider may want to reactivate previously deactivated services or deactivate currently active services. For reactivation, the publisher node device or the subscriber node device associated with the transportation provider may update their respective routing information to subscribe to an existing topic on the broker node device. For deactivation, the publisher node device or the subscriber node device associated with the transportation provider may unsubscribe from a currently subscribed topic on the broker node device 204. The transportation provider may activate new service plans or deactivate the ongoing service plans based on activation or deactivation of an associated subscription to an existing topic on the broker node device 204.

For example, when a new station of a metro transport service opens, multiple ticketing gates may be installed at the station. The IT administrator 116 may use the IT system 114 to setup routing information on each of these ticketing gates. In order to commission such gates on the MaaS platform as publisher node devices, each ticketing gate at the station may update its routing information to commission itself as a publisher node device (i.e. an active node device). Such an update may include addition of new topics or subscription to existing topics on the broker node device 204.

In another embodiment, the first node device 104 may be configured to be commissioned as an active or operational node device based on the update of the routing information. For example, the first node device 104 may update its routing information to commission itself as an active node device. As an active node device, the first node device 104 may be associated with one or more topics on the broker node device 204. In case a topic associated with the first node device 104 is not created on the broker node device 204, the broker node device 204 may create the topic based on a request from the first node device 104.

In another embodiment, the first node device 104 may be configured to be decommissioned as an inactive or non-operational node device based on the update of the routing information. For example, the first node device 104 may update its routing information to decommission itself as an inactive node device. As an inactive node device, the first node device 104 may disassociate itself from one or more topics on the broker node device 204. In some embodiments, the broker node device 204 may delete a topic based on a determination that the topic is only associated with the first node device 104 and not associated with any other node device of the group of node devices 102.

At 304, the updated routing information may be transmitted to the central node device 108. In an embodiment, the first node device 104 may transmit the updated routing information to the central node device 108.

At 306, the updated routing information may be recorded. In an embodiment, the central node device 108 may receive the updated routing information from the first node device 104 and may record the updated routing information as a new routing configuration associated with the first node device 104 in a central routing configuration repository 110A of the central storage repository 110. The central routing configuration repository 110A may associate a revision identifier (ID) or a release version with the updated routing information (i.e., the new routing configuration information) associated with the first node device 104.

At 308, the updated routing information may be transmitted to the set of second node devices 106. In an embodiment, the central node device 108 may transmit the updated routing information and information including the revision ID associated with the updated routing information to the set of second node devices 106.

For example, if the first node device 104 is implemented as the first publisher node device 202A, then the central node device 108 may transmit the updated routing information and information including the revision ID associated with the updated routing information to each of the first subscriber node device 206A, the first node 208A of the distributed ledger 208, and the broker node device 204. Similarly, if the first node device 104 is implemented as the first subscriber node device 206A, then the central node device 108 may transmit the updated routing information and information including the revision ID associated with the updated routing information to each of the first publisher node device 202A, the first node 208A of the distributed ledger 208, and the broker node device 204.

In an embodiment, the revision ID shared by the central node device 108 with each of the set of second node devices 106 may be same as the revision ID of the updated routing information at the central routing configuration repository 110A of the central node device 108.

At 310, the updated routing information may be validated. The set of second node devices 106 may receive the updated routing information from the central node device 108 and may validate the received updated routing information. In an embodiment, each node device of the set of second node devices 106 may execute a software-based smoke test for fitness of the updated routing information with a stored version of the routing information on the broker node device 204 of the group of node devices 102. For example, each node device of the set of second node devices 106 may execute a build verification test of the updated routing information as part of the software-based smoke test based on a version of the routing information stored on the broker node device 204 and a locally stored version of the routing information on each node device of the set of second node devices 106. The build verification test may be executed to determine whether the updated routing information is stable or not. The set of second node devices 106 may validate the updated routing information based on a determination that the updated routing information satisfies a set of passing conditions associated with the executed software-based smoke test. For example, based on the build verification testing, the set of second node devices 106 may determine whether new or critical functionalities, features, and/or properties of the updated routing information works correctly or not.

In an embodiment, each of the set of second node devices 106 may perform a null check and/or a type check on the updated routing information to determine a validity of the updated routing information. For example, each of the set of second node devices 106 may check whether the updated routing information is null or whether the updated routing information has valid data types associated with various data elements or fields in the updated routing information.

In another embodiment, each of the set of second node devices 106 may perform a network connectivity test based on transmission of sample requests to the first node device 104. For example, each of the set of second node devices 106 may create a sample data packet with dummy payload and perform a Packet InterNet Groper (PING) network connectivity test to determine a connectivity with the first node device 104 and a response time associated with a receipt of an acknowledgement packet from the first node device 104.

In another embodiment, the set of second node devices 106 may determine a first release version of the routing information (that may be a current version of the routing information locally stored on the set of second node devices 106) and a second release version of the updated routing information (that may be a new version of the routing information, received by the set of second node devices 106). The set of second node devices 106 may validate the updated routing information based on a determination that the determined second release version supersedes the first release version. For example, the first release version may be compared with the second release version and based on the comparison, it may be determined whether the release version of the updated routing information is a more recent build and release version as compared to that of routing information. If the release version of the updated routing information is a more recent build and release version, the updated routing information may be validated. Otherwise, the updated routing information may be invalidated and rejected as an invalid update.

If the validation at 310 is successful, control may pass to 312 and end thereafter. Otherwise if the validation fails at 310, control may pass to 314 and proceed to 322.

At 312, the updated routing information may be recorded locally by the set of second node devices 106. If the validation of the updated routing information is successful, each node device of the set of second node devices 106 may record the updated routing information locally as a new/latest routing configuration associated with the first node device 104. For example, if the first node device 104 is the first publisher node device 202A such as a ticketing terminal at a train station, then the set of second node devices 106 may include the broker node device 204 and the first subscriber node device 206A. If the updated routing information associated with the first publisher node device 202A is validated, then the broker node device 204 and the first subscriber node device 206A may record the updated routing information locally as new/latest routing configuration associated with the first publisher node device 202A.

At 314, a response indicative of failure in the validation of the updated routing information may be transmitted to the central node device 108. If the validation of the updated routing information fails, each node device of the set of second node devices 106 may transmit a response which may be indicative of the failure in the validation of the updated routing information to the central node device 108.

At 316, one or more errors associated with the failure of the validation may be determined. Such errors may be a cause of the failure of the validation. In an embodiment, the central node device 108 may determine the one or more errors associated with the failure of the validation of the updated routing information. As one example, an error associated with validation may be caused if the release version of the updated routing information precedes that of the routing information stored on each node device of the set of second node devices 106. As another example, another error associated with validation may be caused if the updated routing information includes topics, which don't exist on the broker node device 204 or have been removed recently by the broker node device 204.

At 318, instructions to correct the updated routing information may be transmitted to the first node device 104. In an embodiment, the central node device 108 may transmit the instructions to the first node device 104 to correct the updated routing information based on the determined one or more errors. For example, these instructions may include error information associated with the determined one or more errors and a set of recommended solutions to mitigate the cause of the determined one or more errors. The first node device 104 may receive the instructions to correct the updated routing information and use the received instructions to remove the determined one or more errors that resulted in the failure of the validation.

At 320, the routing information may be restored on the central node device 108. In an embodiment, the central node device 108 may restore the routing information associated with the first node device 104 in the central routing configuration repository 110A of the central storage repository 110.

For example, the central node device 108 may roll-back changes which may be applied to the central routing configuration repository 110A of the central storage repository 110 based on the updated routing information (received and recorded at 306). Thereafter, the central node device 108 may restore a stable version of the routing information associated with the first node device 104 in the central routing configuration repository 110A. The restored version of the routing information may correspond to a version which existed previously (i.e. a before error state) on the central routing configuration repository 110A. The version ID associated with the restored routing information may precede the version ID associated with the updated routing information which failed the validation at 310.

At 322, instructions to restore the routing information locally may be transmitted to the set of second node devices 106. In an embodiment, the central node device 108 may transmit the instructions to the set of second node devices 106 to locally restore the routing information. For such restoration, each node device of the set of second node devices 106 may roll-back changes which may be applied to the routing information (previously stored) based on the updated routing information.

In an embodiment, if any one of the set of second node devices 106 detects a failure of the validation of the updated routing information, the central node device 108 may transmit instructions to the group of node devices 102 to restore the stable version of the routing information. Based on the instructions, each of the group of node devices 102 may restore the stable version of the routing information associated with the first node device 104.

In another embodiment, while the node device 106A of the set of second node devices 106 successfully validates the updated routing information, the node device 106B and all remaining node devices in the set of second node devices 106 may detect a failure in the validation of the updated routing information. In such a case, a partial recovery or restoration may be performed. For example, the central node device 108 may transmit an instruction to the node device 106A to record the updated routing information locally. The central node device 108 may transmit another instruction to the node device 106B and all the remaining node devices to restore the stable version (i.e. before error state) of the routing information. Based on the instruction, the node device 106A may record the updated routing information locally. Similarly, each of the node device 106B and all the remaining node devices may restore the stable version (i.e. before error state) of the routing information based on the instruction. Control may pass to end.

Figure 4:
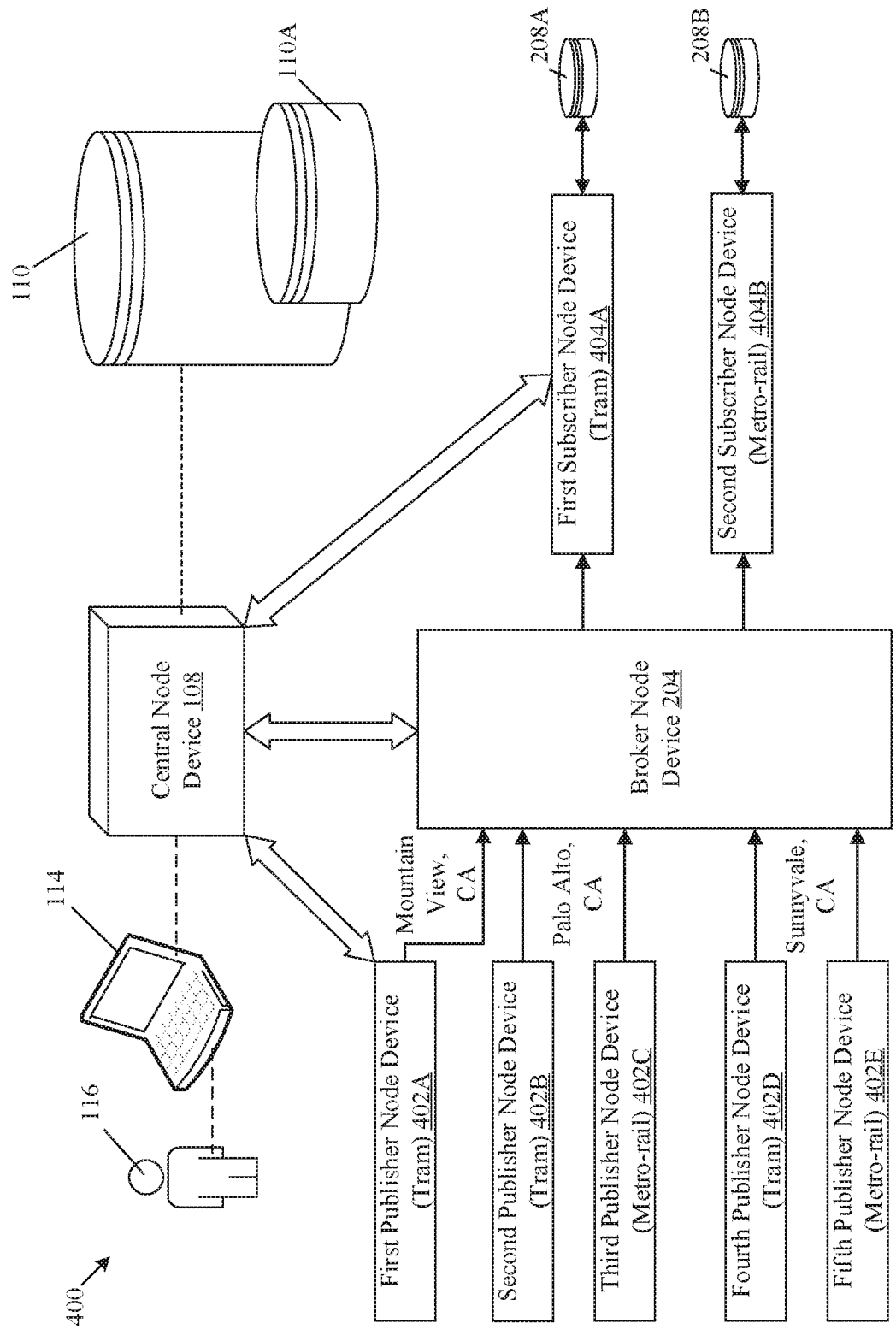
FIG. 4 is a diagram that illustrates node configuration management for an exemplary implementation of the distributed ledger based MaaS platform of FIG. 2, in accordance with an embodiment of the disclosure.

FIG. 4 is a diagram that illustrates node configuration management for an exemplary implementation of the distributed ledger based MaaS platform of FIG. 2, in accordance with an embodiment of the disclosure. FIG. 4 is explained in conjunction with elements from FIGS. 1, 2, and 3. With reference to FIG. 4, there is shown an exemplary implementation 400 of the distributed ledger based MaaS platform of FIG. 2. In the exemplary implementation 400, there is shown a first publisher node device 402A of a tram service provider, a second publisher node device 402B for the tram service, a third publisher node device 402C of a metro-rail service provider, a fourth publisher node device 402D for the tram service, and a fifth publisher node device 402E for the metro-rail service. In the exemplary implementation 400, there is further shown the broker node device 204, a first subscriber node device 404A for the tram service, and a second subscriber node device 404B for the metro-rail service. Each of the publisher node devices 402A to 402E may be communicatively coupled to the broker node device 204, via one or more communication networks. The broker node device 204 may be communicatively coupled to each of the subscriber node devices 404A and 404B, via one or more communication networks. The tram service provider may provide a ticketing service at a first location, such as Mountain View (Calif.), through the first publisher node device 402A. Further, the tram service provider may provide a ticketing service at a second location, such as Palo Alto (Calif.), through the second publisher node device 402B, and at a third location, such as Sunnyvale (Calif.), through the fourth publisher node device 402D. Further, the metro-rail service provider may provide a ticketing service at the second location (i.e., Palo Alto, Calif.) through the third publisher node device 402C and at the third location (i.e., Sunnyvale, Calif.) through the fifth publisher node device 402E.

The first subscriber node device 404A may be associated with the first node 208A of the distributed ledger 208 and the second subscriber node device 404B may be associated with the second node 208B of the distributed ledger 208. In the exemplary implementation 400, there is further shown the central node device 108 that may include the central storage repository 110. The central node device 108 may be communicatively coupled to node devices, including the publisher node devices 402A to 402E, the broker node device 204, and the subscriber node devices 404A and 404B. In the exemplary implementation 400, there is further shown the IT system 114 that may be communicatively coupled to the central node device 108. In the exemplary implementation 400, there is further shown the IT administrator 116 who may use the IT system 114.

The number of the publisher node devices, the subscriber node devices, and the nodes of the distributed ledger 208 in FIG. 4 are merely presented as example. The present disclosure may also be applicable to more or lesser number of the publisher node devices, the subscriber node devices, and the nodes of the distributed ledger 208, without a deviation from the scope of the disclosure.

At any time-instant, the first publisher node device 402A of the tram service provider may update routing information associated with itself locally. Such an update may be based on a release schedule which may be configured by the IT system 114. For example, the IT system 114 may include a spreadsheet application, through which the IT administrator 116 may provide the user input to configure the release schedule for the update of the routing information associated with the first publisher node device 402A.

The central node device 108 may receive the updated routing information from the first publisher node device 402A and may transmit the updated routing information to the broker node device 204, the first subscriber node device 404A for the tram service, and the first node 208A of the distributed ledger 208. Each of the broker node device 204, the first subscriber node device 404A for the tram service, and the first node 208A may validate the updated routing information. Details of the validation are provided, for example, in FIG. 3. Based on the validation, each of the broker node device 204, the first subscriber node device 404A for the tram service, and the first node 208A of the distributed ledger 208 may record the updated routing information locally. If the validation fails, errors associated with the failure in the validation may be determined and recovery/restoration may be initiated for each of the broker node device 204, the first subscriber node device 404A for the tram service, and the first node 208A of the distributed ledger 208. Details of recovery/restoration are provided, for example, in FIG. 3.

Figure 5:
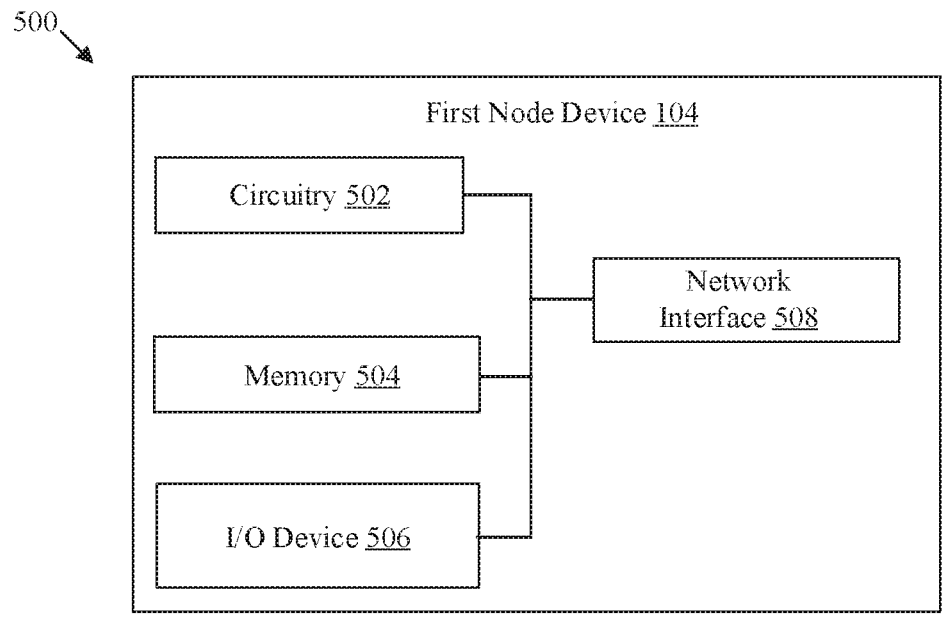
FIG. 5 is a block diagram of an exemplary first node device of the system of FIG. 1, in accordance with an embodiment of the disclosure.

FIG. 5 is a block diagram of an exemplary first node device of the system of FIG. 1, in accordance with an embodiment of the disclosure. FIG. 5 is explained in conjunction with elements from FIGS. 1, 2, 3, and 4. With reference to FIG. 5, there is shown a block diagram 500 of the first node device 104 of FIG. 1. The first node device 104 includes circuitry 502, a memory 504, an input/output (I/O) device 506, and a network interface 508.

The circuitry 502 may be configured to communicate with the set of second node devices 106 and the central node device 108 by use of the network interface 508. The circuitry 502 may include suitable logic, circuitry, interfaces, and/or code that may be configured to execute instructions for operations to be executed by the first node device 104. Examples of implementation of the circuitry 502 may include a Central Processing Unit (CPU), x86-based processor, a Reduced Instruction Set Computing (RISC) processor, an Application-Specific Integrated Circuit (ASIC) processor, a Complex Instruction Set Computing (CISC) processor, a Graphical Processing Unit (GPU), co-processors, other processors, and/or a combination thereof.

The memory 504 may include suitable logic, circuitry, code, and/or interfaces that may be configured to store the instructions executable by the circuitry 502. Examples of implementation of the memory 504 may include, but are not limited to, Random Access Memory (RAM), Read Only Memory (ROM), Hard Disk Drive (HDD), and/or a Secure Digital (SD) card.

The I/O device 506 may include suitable logic, circuitry, and/or interfaces that may be configured to receive an input and provide an output based on the received input. The I/O device 506 may include various input and output devices, which may be configured to communicate with the circuitry 502. Examples of the I/O device 506 may include, but are not limited to, a touch screen, a keyboard, a mouse, a joystick, a display device, a microphone, or a speaker.

The network interface 508 may include suitable logic, circuitry, interfaces, and/or code that may be configured to enable communication between the first node device 104, the set of second node devices 106, and the central node device 108, via one or more communication networks (not shown). The network interface 508 may implement known technologies to support wired or wireless communication with the one or more communication networks.

The network interface 508 may include, but is not limited to, an antenna, a frequency modulation (FM) transceiver, a radio frequency (RF) transceiver, one or more amplifiers, a tuner, one or more oscillators, a digital signal processor, a coder-decoder (CODEC) chipset, a subscriber identity module (SIM) card, and/or a local buffer. The network interface 508 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as Long Term Evolution (LTE), Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.120g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The functions or operations executed by the first node device 104, as described in FIGS. 1, 2, 3, and 8, may be performed by the circuitry 502. Operations executed by the circuitry 502 are described in detail, for example, in FIGS. 1, 3, and 8.

Figure 6:
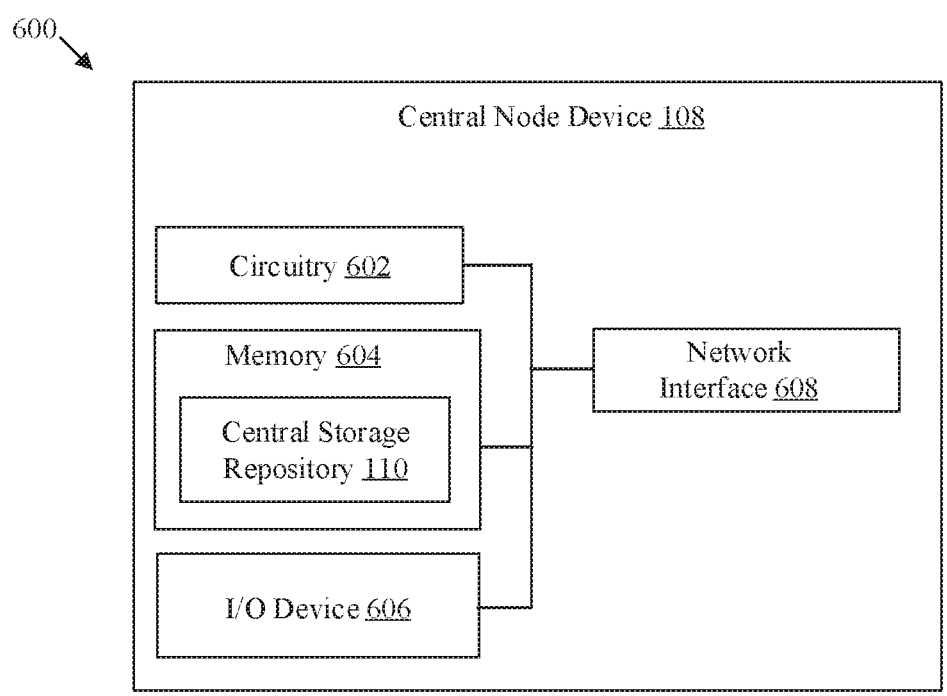
FIG. 6 is a block diagram of an exemplary central node device of the system of FIG. 1, in accordance with an embodiment of the disclosure.

FIG. 6 is a block diagram of an exemplary central node device of the system of FIG. 1, in accordance with an embodiment of the disclosure. FIG. 6 is explained in conjunction with elements from FIGS. 1, 2, 3, 4, and 5. With reference to FIG. 6, there is shown a block diagram 600 of the central node device 108. The central node device 108 includes circuitry 602, a memory 604, a I/O device 606, and a network interface 608.

The circuitry 602 may be configured to communicate with the first node device 104 and the set of second node devices 106 by use of the network interface 608. The circuitry 602 may include suitable logic, circuitry, interfaces, and/or code that may be configured to execute instructions for operations to be executed by the central node device 108. Examples of implementation of the circuitry 602 may include a CPU, x86-based processor, a RISC processor, an ASIC processor, a CISC processor, a GPU, a co-processor, or a combination thereof.

The memory 604 may include suitable logic, circuitry, code, and/or interfaces that may be configured to store the instructions executable by the circuitry 602. The memory 604 may include the central storage repository 110 that may store the routing information, or the updated routing information associated with the first node device 104. Examples of implementation of the memory 604 may include, but are not limited to, RAM, ROM, HDD, Solid-State Device (SSD), or a SD card.

The I/O device 606 may include suitable logic, circuitry, and/or interfaces that may be configured to receive an input and provide an output based on the received input. The I/O device 606 may include various input and output devices, which may be configured to communicate with the circuitry 602. Examples of the I/O device 606 may include, but are not limited to, a touch screen, a keyboard, a mouse, a joystick, a display device, a microphone, and a speaker.

The network interface 608 may include suitable logic, circuitry, interfaces, and/or code that may be configured to enable the central node device 108 to communicate with the first node device 104 and the set of second node devices 106, via the communication network 112. The network interface 608 may implement known technologies to support wired or wireless communication with one or more communication networks, such as the communication network 112. The functions of the network interface 608 may be same as the functions of the network interface 508, as described, for example, in FIG. 5. Therefore, the description of the network interface 608 is omitted from the disclosure for the sake of brevity.

Figure 8:
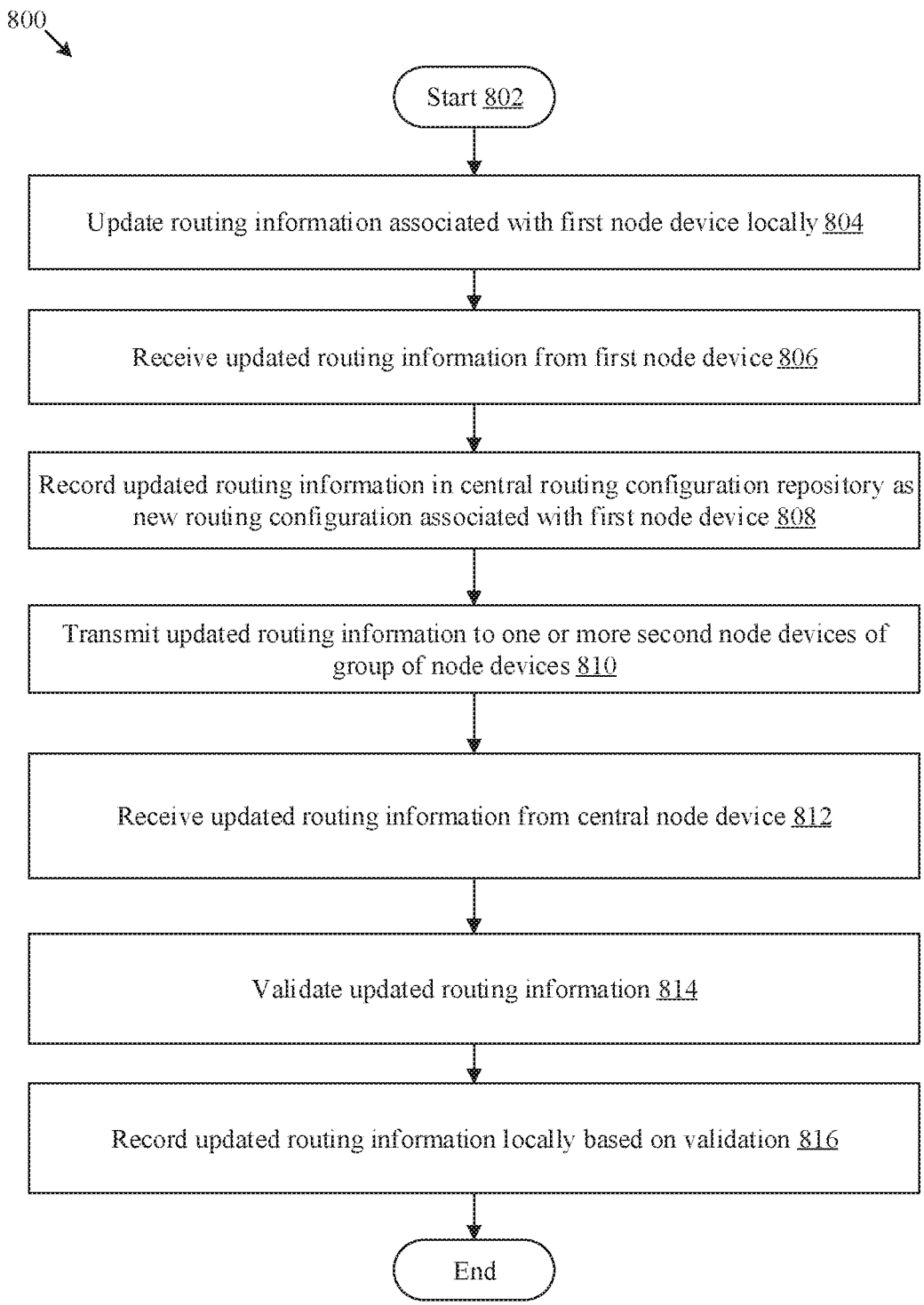
FIG. 8 is a flowchart that illustrates an exemplary method for management of node configuration for a MaaS platform, in accordance with an embodiment of the disclosure.

The functions or operations executed by the central node device 108, as described in FIGS. 1, 3, and 8, may be performed by the circuitry 602. Operations executed by the circuitry 602 are described in detail, for example, in FIGS. 1, 3, and 8.

Figure 7:
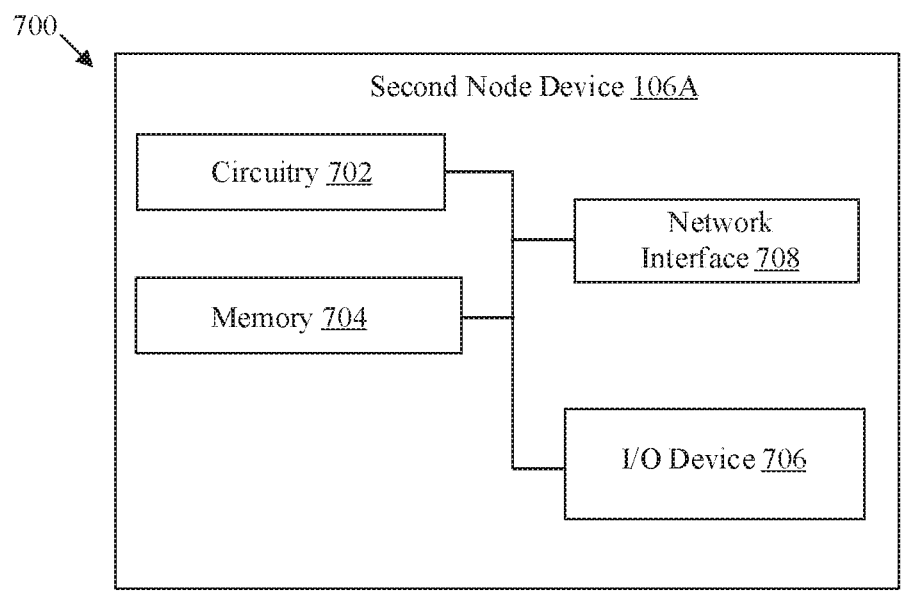
FIG. 7 is a block diagram of an exemplary node device of a set of second node devices of the system of FIG. 1, in accordance with an embodiment of the disclosure.

FIG. 7 is a block diagram of an exemplary node device of a set of second node devices of the system of FIG. 1, in accordance with an embodiment of the disclosure. FIG. 7 is explained in conjunction with elements from FIGS. 1, 2, 3, 4, 5, and 6. With reference to FIG. 7, there is shown a block diagram 700 of the node device 106A. The node device 106A includes circuitry 702, a memory 704, a I/O device 706, and a network interface 708.

The circuitry 702 may be configured to communicate with the first node device 104 and the central node device 108 by use of the network interface 708. The circuitry 702 may include suitable logic, circuitry, interfaces, and/or code that may be configured to execute instructions for operations to be executed by the node device 106A. Examples of implementation of the circuitry 702 may include a CPU, x86-based processor, a RISC processor, an ASIC processor, a CISC processor, a GPU, a co-processor, or a combination thereof.

The memory 704 may include suitable logic, circuitry, code, and/or interfaces that may be configured to store the instructions executable by the circuitry 702. Examples of implementation of the memory 704 may include, but are not limited to, RAM, ROM, HDD, and/or a SD card.

The I/O device 706 may include suitable logic, circuitry, and/or interfaces that may be configured to receive an input and provide an output based on the received input. The I/O device 706 may include various input and output devices, which may be configured to communicate with the circuitry 702. Examples of the I/O device 706 may include, but are not limited to, a touch screen, a keyboard, a mouse, a joystick, a display device, a microphone, and a speaker.

The network interface 708 may include suitable logic, circuitry, interfaces, and/or code that may be configured to enable the node device 106A to communicate with the first node device 104, the central node device 108 or other devices/networks of system 100. The network interface 708 may implement known technologies to support wired or wireless communication via a communication network. The functions of the network interface 708 may be same as the functions of the network interface 508, as described, for example, in FIG. 5. Therefore, the description of the network interface 708 is omitted from the disclosure for the sake of brevity.

The functions or operations executed by the node device 106A, as described in FIGS. 1, 3, and 8, may be performed by the circuitry 702. Operations executed by the circuitry 702 are described in detail, for example, in FIGS. 1, 3, and 8.

FIG. 8 is a flowchart that illustrates an exemplary method for management of node configuration for a MaaS platform, in accordance with an embodiment of the disclosure. FIG. 8 is described in conjunction with elements from FIGS. 1, 2, 3, 4, 5, 6, and 7. With reference to FIG. 8, there is shown a flowchart 800. The exemplary method of the flowchart 800 may be executed by any computing system, for example, by the system 100 of FIG. 1 or the system 200 of FIG. 2. The exemplary method of the flowchart 800 may start at 802 and proceed to 804.

At 804, the routing information associated with the first node device 104 may be updated locally. In an embodiment, the first node device 104 may be configured to update the routing information associated with the first node device 104 locally and store the updated routing information in the memory 404. For that, the IT system 114 may receive a user input from the IT administrator 116. The user input may be associated with a release schedule for the update of the routing information associated with the first node device 104. For example, the IT system 114 may include a spreadsheet application, through which the IT administrator 116 may provide the user input to set the release schedule for the update of the routing information associated with the first node device 104. The IT system 114 may store the set release schedule in the central routing configuration repository 110A of the central storage repository 110 in the central node device 108.

The central node device 108 may transmit the set release schedule for the update of the routing information to the first node device 104. The first node device 104 may receive the set release schedule and store the set release schedule locally. Thereafter, based on the release schedule, the first node device 104 may update the routing information locally. In an alternate embodiment, the first node device 104 may update the routing information associated with the first node device 104 locally without the release schedule. The first node device 104 may be configured to transmit the updated routing information associated with the first node device 104 to the central node device 108. The update of the routing information is explained further, for example, in FIGS. 3 and 4.

At 806, the updated routing information may be received from the first node device 104. In an embodiment, the central node device 108 may be configured to receive the updated routing information associated with the first node device 104 from the first node device 104.

At 808, the updated routing information may be recorded as a new routing configuration associated with the first node device 104 in the central routing configuration repository 110A of the central storage repository 110. In an embodiment, the central node device 108 may be configured to record the updated routing information associated with the first node device 104 as the new routing configuration in the central storage repository 110 of the central node device 108.

At 810, the updated routing information may be transmitted to the set of second node devices 106 of the group of node devices 102. In an embodiment, the central node device 108 may be configured to transmit the updated routing information to the set of second node devices 106.

At 812, the updated routing information may be received from the central node device 108. In an embodiment, the set of second node devices 106 may be configured to receive the updated routing information from the central node device 108.

At 814, the updated routing information may be validated by each node device of the set of second node devices 106. In an embodiment, each node device (e.g., the node device 106A) of the set of second node devices 106 may be configured to validate the updated routing information. The validation of the updated routing information is explained further, for example, in FIG. 3.

At 816, the updated routing information may be recorded locally by each node device of the set of second node devices 106 based on the validation of the updated routing information. In an embodiment, each node device (e.g., the node device 106A) of the set of second node devices 106 may be configured to locally record the updated routing information in a memory or a communicatively coupled storage device of the respective node device (such as the node device 106A) based on the validation of the updated routing information. Control may pass to end.

Although the flowchart 800 is illustrated as discrete operations, such as 804, 806, 808, 810, 812, 814, and 816, the disclosure is not so limited. Accordingly, in certain embodiments, such discrete operations may be further divided into additional operations, combined into fewer operations, or eliminated, depending on the particular implementation without detracting from the essence of the disclosed embodiments.

Exemplary aspects of the disclosure may include a system that may include a group of node devices (such as, the group of node devices 102) and a central node device (such as, the central node device 108). The group of node devices 102 may include a first node device (such as, the first node device 104) that may be configured to update routing information associated with the first node device locally. The group of node devices 102 may be associated with a publish-subscribe pattern. The routing information may include routing rules for propagation of transaction requests to or from the first node device 104. Further, the group of node devices 102 may include a set of second node devices (such as the set of second node devices 106). The central node device 108 may include a central routing configuration repository (such as the central routing configuration repository 110A). The central node device 108 may be configured to receive the updated routing information from the first node device 104 and record the updated routing information in the central routing configuration repository 110A as a new routing configuration associated with the first node device 104. Further, the central node device 108 may be configured to transmit, based on the record, the updated routing information to the set of second node devices 106 of the group of node devices 102. The set of second node devices 106 may be configured to receive the updated routing information from the central node device 108 and validate the updated routing information. The set of second node devices 106 may be further configured to record the updated routing information locally based on the validation.

In an embodiment, the group of node devices 102 may include a publisher node device (such as, the first publisher node device 202A), a subscriber node device (such as, the first publisher node device 202A), and a broker node device (such as, the broker node device 204). The set of second node devices 106 may include the publisher node device and the broker node device if the first node device 104 corresponds to the subscriber node device. The set of second node devices 106 may include the subscriber node device and the broker node device if the first node device 104 corresponds to the publisher node device. Further, the set of second node devices 106 may include the publisher node device and the subscriber node device if the first node device 104 corresponds to the broker node device.

In an embodiment, the first node device 104 may be configured to update the routing information based on a release schedule for the update. In an embodiment, each node device (e.g., the node device 106A) of the set of second node devices 106 may be configured to execute a software-based smoke test for fitness of the updated routing information with a stored version of the routing information on a broker node device of the group of node devices 102. Each node device of the set of second node devices 106 may be further configured to validate the updated routing information based on a determination that the updated routing information satisfies a set of passing conditions associated with the executed software-based smoke test. In another embodiment, each node device of the set of second node devices 106 may be configured to determine a first release version of the routing information and determine a second release version of the updated routing information. Each node device of the set of second node devices 106 may be further configured to validate the updated routing information based on a determination that the determined second release version supersedes the first release version.

In an embodiment, the central node device 108 may be configured to receive a response indicative of a failure in the validation of the updated routing information from the set of second node devices 106. In an embodiment, the central node device 108 may be configured to determine one or more errors associated with the failure in the validation and instruct the first node device 104 based on the determined one or more errors, to correct the updated routing information. In an embodiment, the central node device 108 may be configured to restore the routing information in the central routing configuration repository 110A based on the received response. The central node device 108 may be further configured to instruct each of the set of second node devices 106 to restore the routing information locally.

In an embodiment, the update of the routing information may correspond to one or more of an addition of a first topic as a new transport service on a broker node device of the group of node devices 102, or a deletion of a second topic as an existing transport service from the broker node device. The update of the routing information may further correspond to an addition of a first subscription to an existing topic on the broker node device, or a removal of the first subscription to the existing topic on the broker node device. In addition, the update of the routing information may correspond to a reactivation of a previously deactivated subscription to the existing topic on the broker node device, or a deactivation of a currently active subscription to the existing topic on the broker node device.

In an embodiment, the first node device 104 may be configured to be commissioned based on the update of the routing information, as an active node which may be associated with one or more topics on a broker node device of the group of node devices 102. In another embodiment, the first node device 104 may be configured to be decommissioned based on the update of the routing information, as an inactive node.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that includes a portion of an integrated circuit that also performs other functions.

The present disclosure may also be embedded in a computer program product, which includes all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the particular embodiment disclosed, but that the present disclosure will include all embodiments that fall within the scope of the appended claims.

What is claimed is:

1. A system, comprising:
   a group of node devices comprising a first node device configured to update routing information associated with the first node device locally, wherein
      the group of node devices is associated with a publish-subscribe pattern, and
      the routing information comprises routing rules for propagation of transaction requests to or from the first node device; and
   a central node device comprising a central routing configuration repository, the central node device is configured to:
      receive the updated routing information from the first node device;
      record the updated routing information in the central routing configuration repository as a new routing configuration associated with the first node device; and
      transmit, based on the record, the updated routing information to a set of second node devices of the group of node devices, each node device of the set of second node devices is configured to:
         receive the updated routing information from the central node device;
         validate the updated routing information; and
         record the updated routing information locally based on the validation.

2. The system according to claim 1, wherein
   the group of node devices comprises a publisher node device, a subscriber node device, and a broker node device,
   the set of second node devices comprise the publisher node device and the broker node device if the first node device is the subscriber node device,
   the set of second node devices comprise the subscriber node device and the broker node device if the first node device is the publisher node device, and
   the set of second node devices comprise the publisher node device and the subscriber node device if the first node device is the broker node device.

3. The system according to claim 1, wherein the first node device is configured to update the routing information based on a release schedule for the update.

4. The system according to claim 1, wherein each node device of the set of second node devices is further configured to:
   execute a software-based smoke test for fitness of the updated routing information with a stored version of the routing information on a broker node device of the group of node devices; and
   validate the updated routing information based on a determination that the updated routing information satisfies a set of passing conditions associated with the executed software-based smoke test.

5. The system according to claim 1, wherein each node device of the set of second node devices is further configured to:
  determine a first release version of the routing information;
  determine a second release version of the updated routing information; and
  validate the updated routing information based on a determination that the determined second release version supersedes the first release version.

6. The system according to claim 1, wherein the central node device is further configured to:
  receive, from the set of second node devices, a response indicative of a failure in the validation of the updated routing information;
  determine one or more errors associated with the failure in the validation; and
  instruct the first node device based on the determined one or more errors, to correct the updated routing information.

7. The system according to claim 1, wherein the central node device is further configured to:
  receive, from the set of second node devices, a response indicative of a failure in the validation of the updated routing information;
  restore, based on the received response, the routing information in the central routing configuration repository; and
  instruct each of the set of second node devices to restore the routing information locally.

8. The system according to claim 1, wherein the update of the routing information corresponds to one or more of:
  addition of a first topic as a new transport service on a broker node device of the group of node devices,
  deletion of a second topic as an existing transport service from the broker node device,
  addition of a first subscription to an existing topic on the broker node device,
  removal of the first subscription to the existing topic on the broker node device,
  reactivation of a previously deactivated subscription to the existing topic on the broker node device, and
  deactivation of a currently active subscription to the existing topic on the broker node device.

9. The system according to claim 1, wherein the first node device is configured to be commissioned based on the update of the routing information, as an active node which is associated with one or more topics on a broker node device of the group of node devices.

10. The system according to claim 1, wherein the first node device is configured to be decommissioned based on the update of the routing information, as an inactive node.

11. A method, comprising:
  updating, by a first node device of a group of node devices, routing information associated with the first node device locally, wherein
    the group of node devices is associated with a publish-subscribe pattern, and
    the routing information comprises routing rules for propagation of transaction requests to or from the first node device;
  receiving, by a central node device, the updated routing information from the first node device;
  recording, by the central node device, the updated routing information as a new routing configuration associated with the first node device in a central routing configuration repository of the central node device;
  based on the record, transmitting the updated routing information to a set of second node devices of the group of node devices;
  receiving, by each node device of the set of second node devices, the updated routing information from the central node device;
  validating, by each node device of the set of second node devices, the updated routing information; and
  recording, by each node device of the set of second node devices, the updated routing information locally based on the validation.

12. The method according to claim 11, wherein
  the group of node devices comprises a publisher node device, a subscriber node device, and a broker node device,
  the set of second node devices comprise the publisher node device and the broker node device if the first node device is the subscriber node device,
  the set of second node devices comprise the subscriber node device and the broker node device if the first node device is the publisher node device, and
  the set of second node devices comprise the publisher node device and the subscriber node device if the first node device is the broker node device.

13. The method according to claim 11, wherein the routing information is updated based on a release schedule for the update.

14. The method according to claim 11, further comprising:
  executing, by each node device of the set of second node devices, a software-based smoke test for fitness of the updated routing information with a stored version of the routing information on a broker node device of the group of node devices; and
  validating, by each node device of the set of second node devices, the updated routing information based on a determination that the updated routing information satisfies a set of passing conditions associated with the executed software-based smoke test.

15. The method according to claim 11, further comprising:
  determining, by each node device of the set of second node devices, a first release version of the routing information;
  determining, by each node device of the set of second node devices, a second release version of the updated routing information; and
  validating, by each node device of the set of second node devices, the updated routing information based on a determination that the determined second release version supersedes the first release version.

16. The method according to claim 11, further comprising:
  receiving, by the central node device, a response indicative of a failure in the validation of the updated routing information from the set of second node devices;
  determining, by the central node device, one or more errors associated with the failure in the validation; and
  instructing, by the central node device, the first node device based on the determined one or more errors, to correct the updated routing information.

17. The method according to claim 11, further comprising:
- receiving, by the central node device, a response indicative of a failure in the validation of the updated routing information from the set of second node devices;
- restoring, by the central node device, the routing information in the central routing configuration repository of the central node device based on the received response; and
- instructing each of the set of second node devices to restore the routing information locally.

18. The method according to claim 11, wherein the update of the routing information corresponds to one or more of:
- addition of a first topic as a new transport service on a broker node device of the group of node devices,
- deletion of a second topic as an existing transport service from the broker node device,
- addition of a first subscription to an existing topic on the broker node device,
- removal of the first subscription to the existing topic on the broker node device,
- reactivation of a previously deactivated subscription to the existing topic on the broker node device, and
- deactivation of a currently active subscription to the existing topic on the broker node device.

19. The method according to claim 11, further comprising commissioning the first node device based on the update of the routing information, as an active node which is associated with one or more topics on a broker node device of the group of node devices.

20. The method according to claim 11, further comprising decommissioning the first node device as an inactive node of the group of node devices based on the update of the routing information.

* * * * *